(12) United States Patent
Uenaka (10) Patent No.: US 7,693,407 B2
(45) Date of Patent: Apr. 6, 2010

(54) ANTI-SHAKE APPARATUS

(75) Inventor: Yukio Uenaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 228 days.

(21) Appl. No.: 11/775,904

(22) Filed: Jul. 11, 2007

(65) Prior Publication Data

US 2008/0013936 A1 Jan. 17, 2008

(30) Foreign Application Priority Data

Jul. 13, 2006 (JP) ............................. 2006-192647

(51) Int. Cl.
*G03B 17/00* (2006.01)
*H04N 5/228* (2006.01)
(52) U.S. Cl. ..................... 396/55; 348/208.2
(58) Field of Classification Search ............... 396/55; 348/208.99, 208.2, 208.4, 208.5, 208.7
See application file for complete search history.

(56) References Cited

U.S. PATENT DOCUMENTS

| | | | | |
|---|---|---|---|---|
| 5,617,177 | A * | 4/1997 | Imafuji et al. ................. | 396/53 |
| 5,933,660 | A * | 8/1999 | Shiomi ........................ | 396/55 |
| 6,263,162 | B1 | 7/2001 | Yamazaki et al. | |
| 6,389,228 | B1 | 5/2002 | Uenaka | |
| 6,393,215 | B1 * | 5/2002 | Washisu ...................... | 396/52 |
| 6,408,135 | B1 | 6/2002 | Imada | |
| 6,456,789 | B1 | 9/2002 | Uenaka | |
| 6,654,554 | B2 | 11/2003 | Uenaka | |
| 2003/0035651 | A1 * | 2/2003 | Ueda et al. ................... | 396/55 |

FOREIGN PATENT DOCUMENTS

| | | |
|---|---|---|
| JP | 7 261234 | 10/1995 |
| JP | 8 262522 | 10/1996 |
| JP | 9 51465 | 2/1997 |
| JP | 2897413 | 3/1999 |
| JP | 11 218794 | 8/1999 |
| JP | 2000 122106 | 4/2000 |
| JP | 2000 321612 | 11/2000 |
| JP | 2001 159767 | 6/2001 |
| JP | 2001 223932 | 8/2001 |
| JP | 2001 305597 | 10/2001 |
| JP | 2003 43544 | 2/2003 |
| JP | 2005 292799 | 10/2005 |
| JP | 2006 39183 | 2/2006 |
| JP | 2006 84540 | 3/2006 |

OTHER PUBLICATIONS

U.S. Appl. No. 11/775,889 to Uenaka, filed Jul. 11, 2007.

(Continued)

*Primary Examiner*—W. B. Perkey
*Assistant Examiner*—Noam Reisner
(74) *Attorney, Agent, or Firm*—Greenblum & Bernstein, P.L.C.

(57) ABSTRACT

An anti-shake apparatus for image stabilizing comprises an angular velocity sensor and a controller. The angular velocity sensor detects an angular velocity. The controller controls the angular velocity sensor and performs an anti-shake operation on the basis of an output signal from the angular velocity sensor. The controller performs a modification of an offset output in the value of the output signal during a predetermined period of the anti-shake operation, and does not perform the modification except for during the predetermined period.

16 Claims, 7 Drawing Sheets

OTHER PUBLICATIONS

U.S. Appl. No. 11/775,887 to Uenaka, filed Jul. 11, 2007.
U.S. Appl. No. 11/775,886 to Uenaka, filed Jul. 11, 2007.
U.S. Appl. No. 11/775,891 to Uenaka, filed Jul. 11, 2007.
U.S. Appl. No. 11/775,900 to Uenaka, filed Jul. 11, 2007.
U.S. Appl. No. 11/775,898 to Uenaka, filed Jul. 11, 2007.
U.S. Appl. No. 11/775,912 to Uenaka, filed Jul. 11, 2007.
U.S. Appl. No. 11/775,922 to Uenaka, filed Jul. 11, 2007.
English language Abstract of JP 7-261234.
English language Abstract of JP 11-218794.
English language Abstract of JP 2000-321612.
English language Abstract of JP 2001-305597.
English language Abstract of JP 2003-43544.
English language Abstract of JP 9-51465.
English language Abstract of JP 2000-122106.
English language Abstract of JP 2001-223932.
English language Abstract of JP 2006-39183.
English language Abstract of JP 2006-84540.
English language Abstract of JP 8-262522.
English language Abstract of JP 2001-159767.
English language Abstract of JP 2005-292799.

* cited by examiner

ANTI-SHAKE APPARATUS

BACKGROUND OF THE INVENTION

1. Field of the Invention

The present invention relates to an anti-shake apparatus for a photographing apparatus, and in particular to the modification of the offset output in an output signal from the angular velocity sensor in a predetermined period of the anti-shake operation.

2. Description of the Related Art

An anti-shake apparatus for a photographing apparatus is proposed. The anti-shake apparatus corrects for hand-shake effect by moving a hand-shake correcting lens or an imaging device on a plane that is perpendicular to the optical axis, in a manner corresponding to the amount of hand-shake which occurs during the imaging process.

Japanese unexamined patent publication (KOKAI) No. H09-51465 discloses an anti-shake apparatus that detects the electric power of the power supply and reduces an offset output that is included in the output signal from the angular velocity sensor when a change in the electric power occurs, by changing the characteristic of the filter that filters the output signal from the output signal of the angular velocity sensor (the gyro sensor), based on the result of a detection of the change of the electric power.

However, it is necessary to comprise a detection apparatus that detects the electric power of the power supply, besides the angular velocity sensor, so the construction of the anti-shake apparatus becomes complicated.

SUMMARY OF THE INVENTION

Therefore, an object of the present invention is to provide an anti-shake apparatus (an image stabilizing apparatus) that correctly detects the hand-shake quantity in a predetermined period of the anti-shake operation without complicating the construction of the anti-shake apparatus.

According to the present invention, an anti-shake apparatus for image stabilizing comprises an angular velocity sensor and a controller. The angular velocity sensor detects an angular velocity. The controller controls the angular velocity sensor and performs an anti-shake operation on the basis of an output signal from the angular velocity sensor. The controller performs a modification of an offset output in the value of the output signal during a predetermined period of the anti-shake operation, and does not perform the modification except for during the predetermined period.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to the embodiment shown in the drawings. In the embodiment, the photographing apparatus 1 is a digital camera. A camera lens 67 of the photographing apparatus 1 has an optical axis LX.

Figure 1:
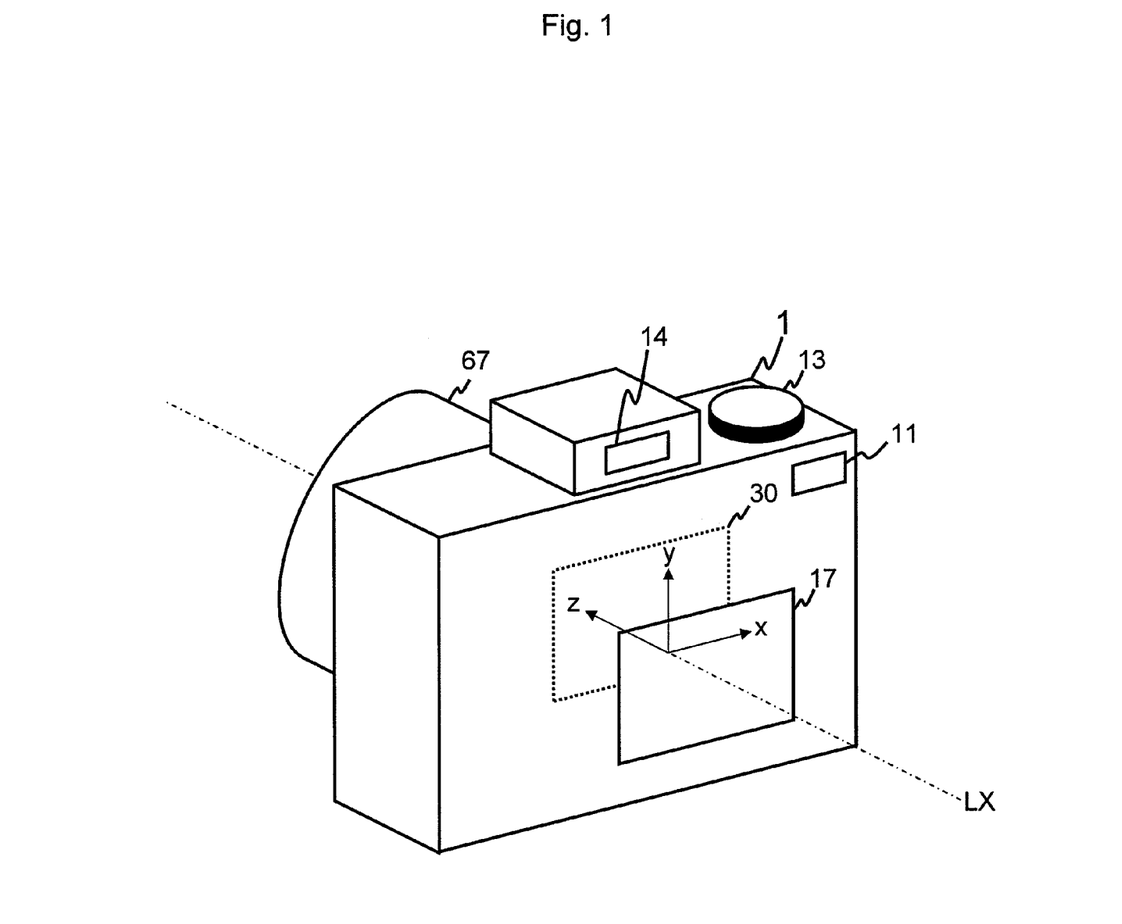
FIG. 1 is a perspective rear view of the embodiment of the photographing apparatus viewed from the back side.

In order to explain the direction in the embodiment, a first direction x, a second direction y, and a third direction z are defined (see FIG. 1). The first direction x is a direction which is perpendicular to the optical axis LX. The second direction y is a direction which is perpendicular to the optical axis LX and the first direction x. The third direction z is a direction which is parallel to the optical axis LX and perpendicular to both the first direction x and the second direction y.

Figure 2:
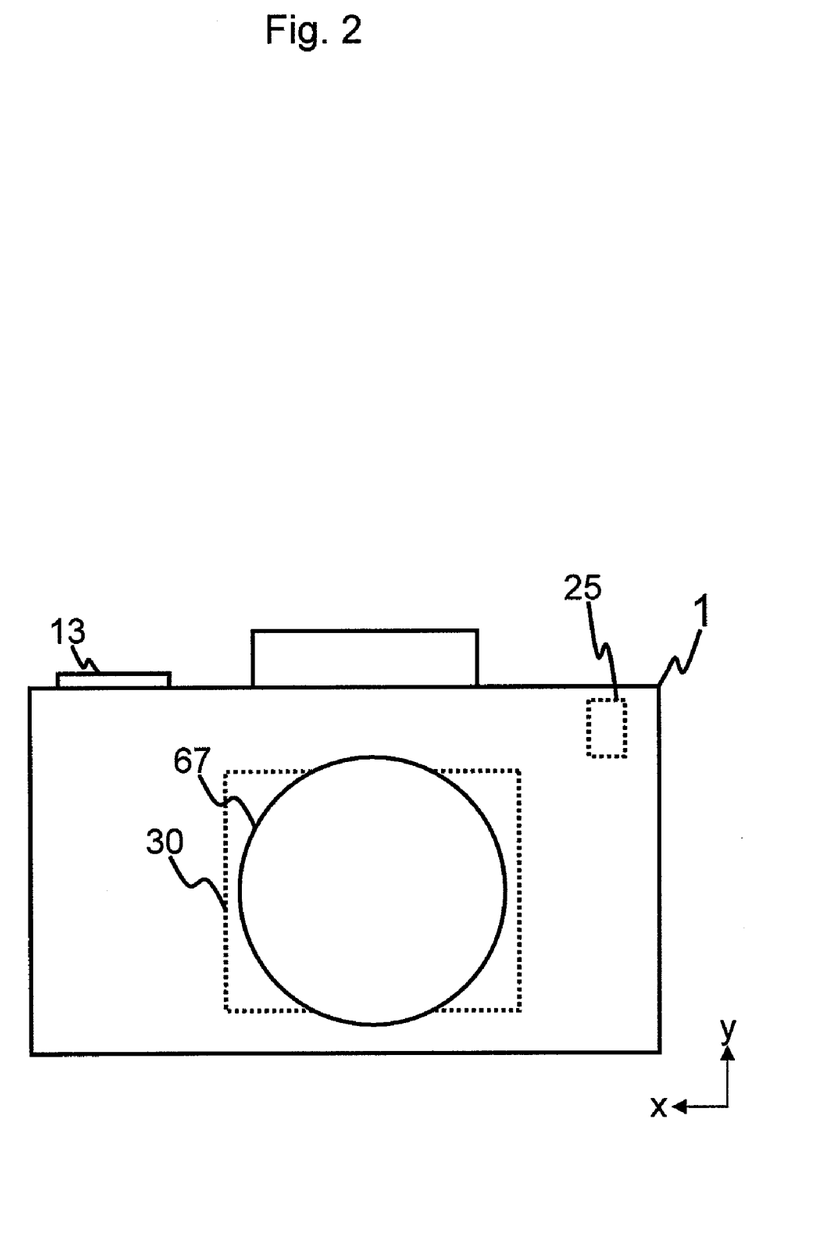
FIG. 2 is a front view of the photographing apparatus.
Figure 3:
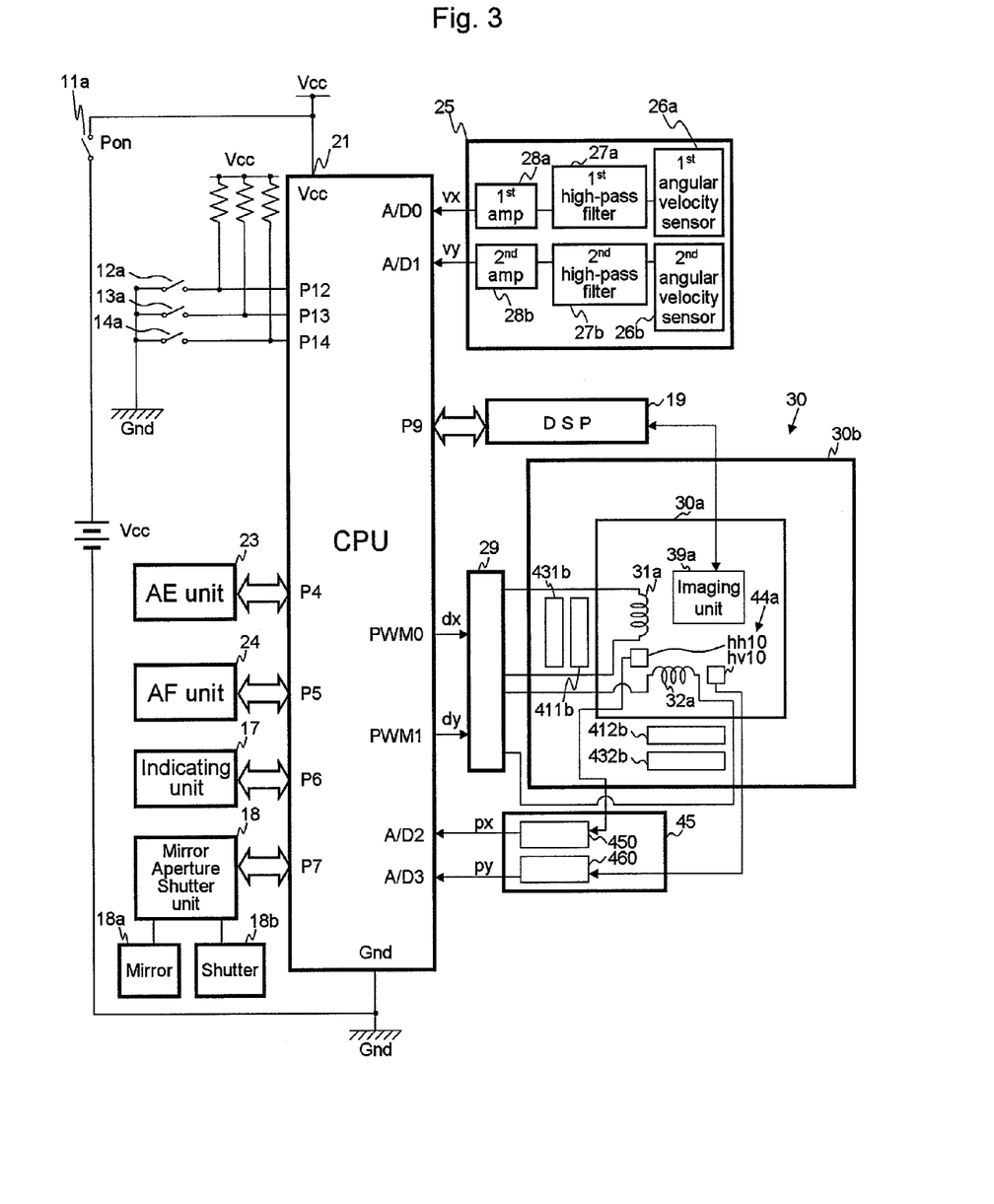
FIG. 3 is a circuit construction diagram of the photographing apparatus.

The imaging part of the photographing apparatus 1 comprises a PON button 11, a PON switch 11a, a photometric switch 12a, a release button 13, a release switch 13a, an anti-shake button 14, an anti-shake switch 14a, an indicating unit 17 such as an LCD monitor etc., a mirror-aperture-shutter unit 18, a DSP 19, a CPU 21, an AE (automatic exposure) unit 23, an AF (automatic focus) unit 24, an imaging unit 39a in the anti-shake unit 30, and a camera lens 67 (see FIGS. 1, 2, and 3).

Whether the PON switch 11a is in the ON state or the OFF state, is determined by the state of the PON button 11, so that the ON/OFF states of the photographing apparatus 1 correspond to the ON/OFF states of the PON switch 11a.

The photographic subject image is captured as an optical image through the camera lens 67 by the imaging unit 39a, and the captured image is displayed on the indicating unit 17. The photographic subject image can be optically observed by the optical finder (not depicted).

When the release button 13 is partially depressed by the operator, the photometric switch 12a changes to the ON state so that the photometric operation, the AF sensing operation, and the focusing operation are performed.

When the release button 13 is fully depressed by the operator, the release switch 13a changes to the ON state so that the imaging operation by the imaging unit 39a (the imaging apparatus) is performed, and the image, which is captured, is stored.

In the embodiment, the anti-shake operation is performed from the point when the release switch 13a is set to the ON state, to the point when the release sequence operation (the photographing operation) is finished. However, the anti-shake operation may be performed except for during the release sequence operation.

The mirror-aperture-shutter unit 18 is connected to port P7 of the CPU 21 and performs an UP/DOWN operation of a mirror 18a (a mirror-up operation and a mirror-down operation), an OPEN/CLOSE operation of the aperture, and an OPEN/CLOSE operation of a shutter 18b corresponding to the ON state of the release switch 13a.

While the mirror-up operation of the mirror 18a is being performed, or while the mirror up switch (not depicted) is set to the ON state so that the movement of the front curtain of the shutter 18b is being performed, a front curtain movement signal (not depicted) is set to the ON state.

The DSP 19 is connected to port P9 of the CPU 21, and it is connected to the imaging unit 39a. Based on a command from the CPU 21, the DSP 19 performs the calculation operations, such as the image processing operation etc., on the image signal obtained by the imaging operation of the imaging unit 39*a*.

The CPU 21 is a control apparatus that controls each part of the photographing apparatus 1 regarding the imaging operation and the anti-shake operation (i.e. the image stabilizing operation). The anti-shake operation includes both the movement of the movable unit 30*a* and position-detection efforts.

Further, the CPU 21 stores a value of the anti-shake parameter IS that determines whether the photographing apparatus 1 is in the anti-shake mode or not, a value of a release time counter RLST, and a value of a release state parameter RP.

The value of the release state parameter RP changes with respect to the release sequence operation. When the release sequence operation is performed, the value of the release state parameter RP is set to 1 (see steps S21 to S30 in FIG. 4), and when the release sequence operation is finished, the value of the release state parameter RP is set (reset) to 0 (see steps S13 and S30 in FIG. 4).

Figure 7:
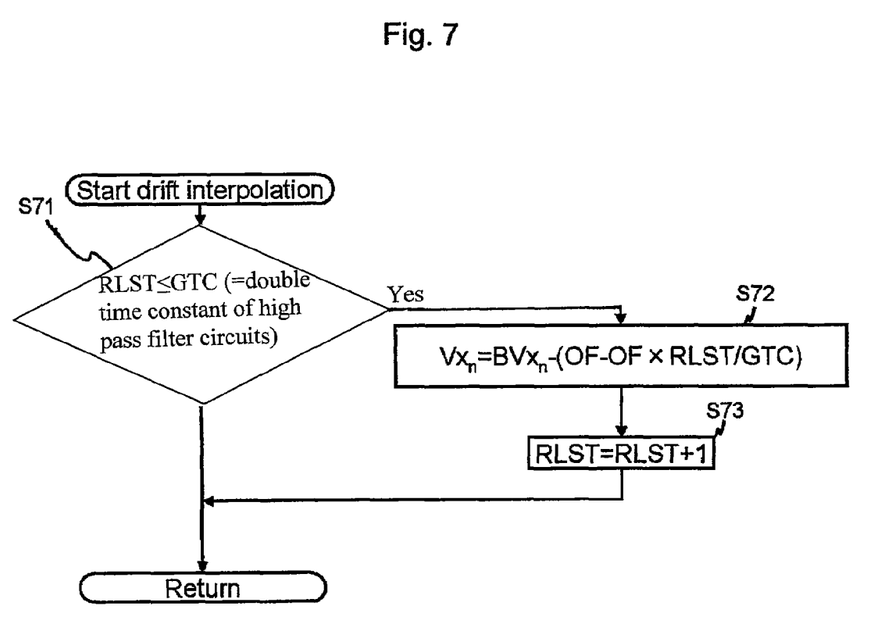
FIG. 7 is a flowchart that shows the detail of the drift interpolation processing operation.

The release time counter RLST is a time counter of an elapsed time from the point when the release sequence operation commences, which functions by increasing the value of the release time counter RLST by 1, with every interruption process that occurs at a predetermined time interval of 1 ms, under a predetermined condition (see step S73 in FIG. 7).

The CPU 21 performs the release sequence operation after the release switch 13*a* is set to the ON state.

Further, the CPU 21 stores values of a first before-drift-interpolation digital angular velocity signal $BVx_n$, a second before-drift-interpolation digital angular velocity signal $BVy_n$, a first digital angular velocity signal $Vx_n$, a second digital angular velocity signal $Vy_n$, a first digital angular velocity $VVx_n$, a second digital angular velocity $VVy_n$, a digital displacement angle $Bx_n$, a second digital displacement angle $By_n$, a coordinate of position $S_n$ in the first direction x: $Sx_n$, a coordinate of position $S_n$ in the second direction y: $Sy_n$, a first driving force $Dx_n$, a second driving force $Dy_n$, a coordinate of position $P_n$ after A/D conversion in the first direction x: $pdx_n$, a coordinate of position $P_n$ after A/D conversion in the second direction y: $pdy_n$, a first subtraction value $ex_n$, a second subtraction value $ey_n$, a first proportional coefficient Kx, a second proportional coefficient Ky, a sampling cycle θ of the anti-shake operation, a first integral coefficient Tix, a second integral coefficient Tiy, a first differential coefficient Tdx, and a second differential coefficient Tdy.

In the embodiment, the first digital angular velocity signal $Vx_n$ is calculated by performing the drift interpolation processing operation on the first before-drift-interpolation digital angular velocity signal $BVx_n$ that is based on the first angular velocity vx.

Similarly, the second digital angular velocity signal $Vy_n$ is calculated by performing the drift interpolation processing operation on the second before-drift-interpolation digital angular velocity signal $BVy_n$ that is based on the second angular velocity vy.

In the drift interpolation processing operation, the offset output corresponding to the large change of electric power based on release operations such as the mirror-up operation of the mirror 18*a*, etc., that occur in a predetermined period (a drift-interpolation reference time GTC: a first time) after the release sequence operation commences (after the release switch 13*a* is set to the ON state), is interpolated; in other words, the offset component of the output from the angular velocity detection unit 25 is reduced. Or, the values of the first and second before-drift-interpolation digital angular velocity signals $BVx_n$ and $BVy_n$ are reduced, so the values of the first and second digital angular velocity signals $Vx_n$ and $Vy_n$ are respectively reduced as the offset components from the values of the first and second before-drift-interpolation digital angular velocity signals $BVx_n$ and $BVy_n$.

When the value of the release time counter RLST is less than or equal to the value of the drift-interpolation reference time GTC, the drift interpolation processing operation is performed.

The value of the drift-interpolation reference time GTC is set as double the time constant of the first and second high-pass filter circuits 27*a* and 27*b*, and is stored in the CPU 21.

When the release sequence operation commences, the large change in the electric power of the main power supply of the photographing apparatus 1 affects the high impedance part of the gyro signal processing circuit, such as the first high-pass filter circuit 27*a* etc., so that an offset (a lag from the reference value) occurs in the output from the angular velocity detection unit 25 (the offset output occurs).

In the calculation of the hand-shake quantity and the position to where the movable unit 30*a* should be moved for anti-shake operation, the output signal from the angular velocity detection unit 25 is integrated; therefore, the change of the value of the output signal caused by the offset output causes a drift in the movement of the movable unit 30*a* during the anti-shake operation. This unnecessary movement means that the anti-shake operation cannot be performed correctly due to the drift.

The offset output indicates a maximum offset output value OF immediately after the release sequence operation commences, and subsequently the offset output gradually decreases, taking the duration of the drift-interpolation reference time GTC, which is double the time constant of the first and second high-pass filter circuits 27*a* and 27*b*.

The inclination of the decrease of the offset output during the drift-interpolation reference time GTC is actually nonlinear; however, it can be considered as linear in the drift interpolation processing operation.

In the embodiment, the drift interpolation processing operation is performed during a predetermined period (the drift-interpolation reference time GTC), after the release sequence operation commences. In the drift interpolation processing operation, the offset components of the output from the angular velocity detection unit 25 (first and second before-gain digital angular velocity signals $BVx_n$ and $BVy_n$, see step S52 in FIG. 5) are reduced (modified) as the decrease of the offset output, corresponding to the elapsed time from when the release sequence operation commences, is almost linear. Therefore, the anti-shake operation (the detection of the hand-shake quantity) can be performed correctly, even if an offset from the angular velocity detection unit 25 occurs.

The maximum offset output value OF is calculated in an adjustment process of the production and is stored in the CPU 21.

The AE unit (an exposure calculating unit) 23 performs the photometric operation and calculates the photometric values, based on the subject being photographed. The AE unit 23 also calculates the aperture value and the time length of the exposure, with respect to the photometric values, both of which are needed for imaging. The AF unit 24 performs the AF sensing operation and the corresponding focusing operation, both of which are needed for imaging. In the focusing operation, the camera lens 67 is re-positioned along the optical axis in the LX direction.

The anti-shake part (the anti-shake apparatus) of the photographing apparatus 1 comprises an anti-shake button 14, an anti-shake switch 14*a*, an indicating unit 17, a CPU 21, an angular velocity detection unit 25, a driver circuit 29, an anti-shake unit 30, a hall-element signal-processing unit 45 (a magnetic-field change-detecting element), and the camera lens 67.

When the anti-shake button 14 is depressed by the operator, the anti-shake switch 14a is changed to the ON state so that the anti-shake operation, in which the angular velocity detection unit 25 and the anti-shake unit 30 are driven independently of the other operations which include the photometric operation etc., is carried out at the predetermined time interval. When the anti-shake switch 14a is in the ON state, in other words in the anti-shake mode, the anti-shake parameter IS is set to 1 (IS=1). When the anti-shake switch 14a is not in the ON state, in other words in the non-anti-shake mode, the anti-shake parameter IS is set to 0 (IS=0). In the embodiment, the value of the predetermined time interval is set to 1 ms.

The various output commands corresponding to the input signals of these switches are controlled by the CPU 21.

The information regarding whether the photometric switch 12a is in the ON state or OFF state is input to port P12 of the CPU 21 as a 1-bit digital signal. The information regarding whether the release switch 13a is in the ON state or OFF state is input to port P13 of the CPU 21 as a 1-bit digital signal. The information regarding whether the anti-shake switch 14a is in the ON state or OFF state is input to port P14 of the CPU 21 as a 1-bit digital signal.

The AE unit 23 is connected to port P4 of the CPU 21 for inputting and outputting signals. The AF unit 24 is connected to port P5 of the CPU 21 for inputting and outputting signals. The indicating unit 17 is connected to port P6 of the CPU 21 for inputting and outputting signals.

Next, the details of the input and output relationships between the CPU 21 and the angular velocity detection unit 25, the driver circuit 29, the anti-shake unit 30, and the hall-element signal-processing unit 45 are explained.

The angular velocity detection unit 25 has a first angular velocity sensor 26a, a second angular velocity sensor 26b, a first high-pass filter circuit 27a, a second high-pass filter circuit 27b, a first amplifier 28a and a second amplifier 28b.

The first angular velocity sensor 26a detects the angular velocity of a rotary motion (the yawing) of the photographing apparatus 1 about the axis of the second direction y (the velocity-component in the first direction x of the angular velocity of the photographing apparatus 1). The first angular velocity sensor 26a is a gyro sensor that detects a yawing angular velocity.

The second angular velocity sensor 26b detects the angular velocity of a rotary motion (the pitching) of the photographing apparatus 1 about the axis of the first direction x (detects the velocity-component in the second direction y of the angular velocity of the photographing apparatus 1). The second angular velocity sensor 26b is a gyro sensor that detects a pitching angular velocity.

The first high-pass filter circuit 27a reduces a low frequency component of the signal output from the first angular velocity sensor 26a, because the low frequency component of the signal output from the first angular velocity sensor 26a includes signal elements that are based on a null voltage and a panning-motion, neither of which are related to hand-shake.

The second high-pass filter circuit 27b reduces a low frequency component of the signal output from the second angular velocity sensor 26b, because the low frequency component of the signal output from the second angular velocity sensor 26b includes signal elements that are based on a null voltage and a panning-motion, neither of which are related to hand-shake.

The first amplifier 28a amplifies a signal regarding the yawing angular velocity, whose low frequency component has been reduced, and outputs the analog signal to the A/D converter A/D 0 of the CPU 21 as a first angular velocity vx.

The second amplifier 28b amplifies a signal regarding the pitching angular velocity, whose low frequency component has been reduced, and outputs the analog signal to the A/D converter A/D 1 of the CPU 21 as a second angular velocity vy.

The reduction of the low frequency signal component is a two-step process; the primary part of the analog high-pass filter processing operation is performed first by the first and second high-pass filter circuits 27a and 27b, followed by the secondary part of the digital high-pass filter processing operation that is performed by the CPU 21.

The cut off frequency of the secondary part of the digital high-pass filter processing operation is higher than that of the primary part of the analog high-pass filter processing operation.

In the digital high-pass filter processing operation, the value of a time constant (a first high-pass filter time constant hx and a second high-pass filter time constant hy) can be easily changed.

The supply of electric power to the CPU 21 and each part of the angular velocity detection unit 25 begins after the PON switch 11a is set to the ON state (the main power supply is set to the ON state). The calculation of a hand-shake quantity begins after the PON switch 11a is set to the ON state.

The CPU 21 converts the first angular velocity vx, which is input to the A/D converter A/D 0, to a first before-drift-interpolation digital angular velocity signal $BVx_n$ (A/D conversion operation); calculates a first digital angular velocity signal $Vx_n$ (the drift interpolation processing operation corresponding to the offset output during the release sequence operation); calculates a first digital angular velocity $VVx_n$ by reducing a low frequency component of the first digital angular velocity signal $Vx_n$ (the digital high-pass filter processing operation) because the low frequency component of the first digital angular velocity signal $Vx_n$ includes signal elements that are based on a null voltage and a panning-motion, neither of which are related to hand-shake; and calculates a hand shake quantity (a hand shake displacement angle: a first digital displacement angle $Bx_n$) by integrating the first digital angular velocity $VVx_n$ (the integration processing operation).

Similarly the CPU 21 converts the second angular velocity vy, which is input to the A/D converter A/D 1, to a second before-drift-interpolation digital angular velocity signal $BVy_n$ (A/D conversion operation); calculates a second digital angular velocity signal $Vy_n$ (the drift interpolation processing operation corresponding to the offset output during the release sequence operation); calculates a second digital angular velocity $VVy_n$ by reducing a low frequency component of the second digital angular velocity signal $Vy_n$ (the digital high-pass filter processing operation) because the low frequency component of the second digital angular velocity signal $Vy_n$ includes signal elements that are based on a null voltage and a panning-motion, neither of which are related to hand-shake; and calculates a hand shake quantity (a hand shake displacement angle: a second digital displacement angle $By_n$) by integrating the second digital angular velocity $VVy_n$ (the integration processing operation).

Accordingly, the CPU 21 and the angular velocity detection unit 25 use a function to calculate the hand-shake quantity.

The value "n" is an integer that is greater than 1, and indicates a length of time (ms) from the point when the interruption process of the timer commences, (t=1, and see step S12 in FIG. 4) to the point when the latest anti-shake operation is performed (t=n).

Figure 6:
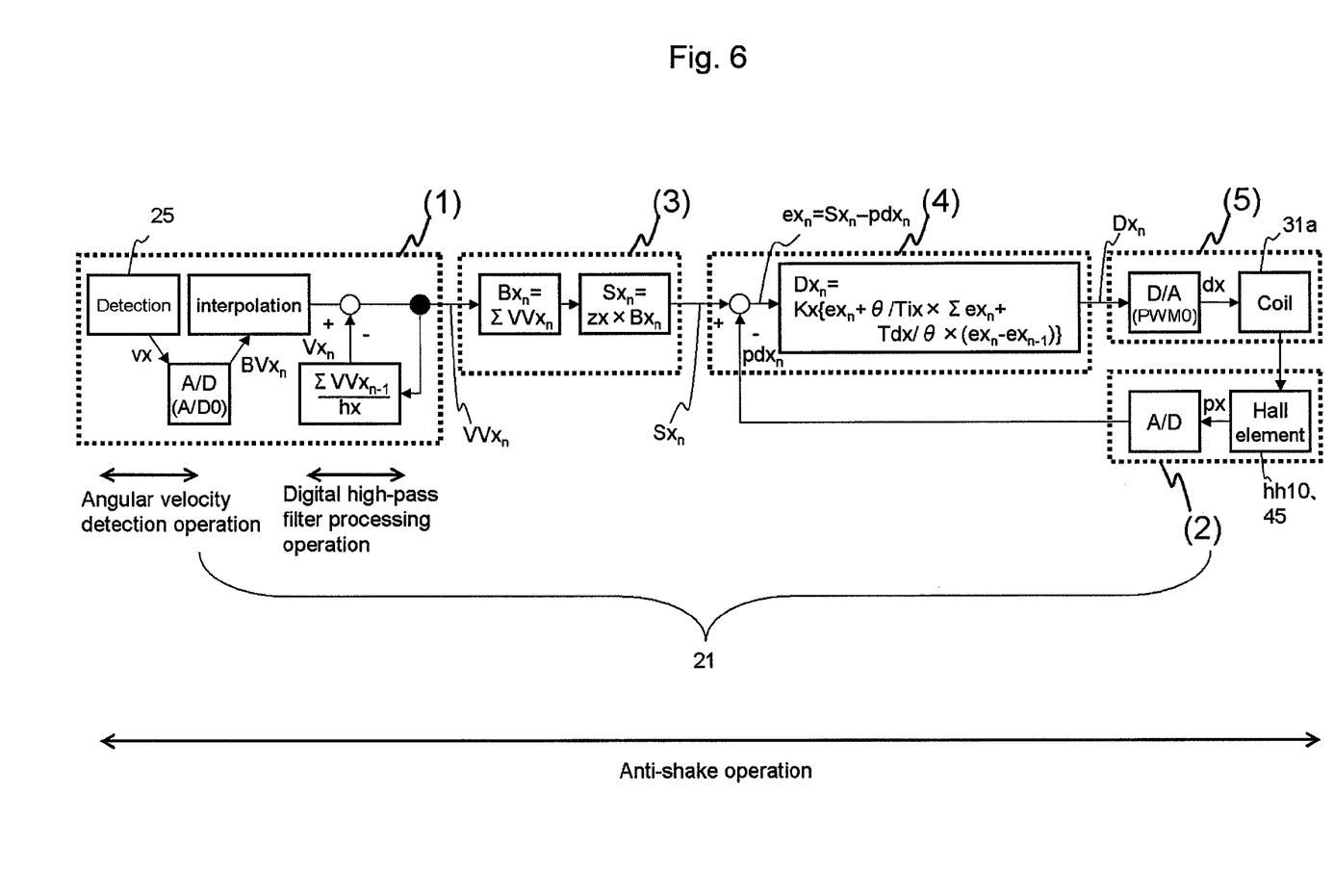
FIG. 6 is a figure that shows calculations in the anti-shake operation.

The drift interpolation processing operation regarding the first direction x that is a calculation of the first digital angular velocity signal $Vx_n$ (see "interpolation" of (1) in FIG. 6), is performed by a calculation based on the first before-drift-interpolation digital angular velocity signal $BVx_n$, the drift-interpolation reference time GTC, the maximum offset output value OF, and the release time counter RLST ($Vx_n=BVx_n-(OF-OF\times RLST\div GTC)$, see step S72 in FIG. 7).

Similarly, the drift interpolation processing operation regarding the second direction y that is a calculation for the second digital angular velocity signal $Vy_n$, is performed by a calculation based on the second before-drift-interpolation digital angular velocity signal $BVy_n$, the drift-interpolation reference time GTC, the maximum offset output value OF, and the release time counter RLST ($Vy_n=BVy_n-(OF-OF\times RLST\div GTC)$).

The drift-interpolation processing operation is not performed except for during the predetermined period (the drift-interpolation reference time GTC), after the release sequence operation commences.

In the digital high-pass filter processing operation regarding the first direction x, the first digital angular velocity $VVx_n$ is calculated by dividing the summation of the first digital angular velocity $VVx_1$ to $VVx_{n-1}$ calculated by the interruption process of the timer before the 1 ms predetermined time interval (before the latest anti-shake operation is performed), by the first high-pass filter time constant hx, and then subtracting the resulting quotient from the first digital angular velocity signal $Vx_n (VVx_n=Vx_n-(\Sigma VVx_{n-1})\div hx$, see (1) in FIG. 6).

In the digital high-pass filter processing operation regarding the second direction y, the second digital angular velocity $VVy_n$ is calculated by dividing the summation of the second digital angular velocity $VVy_1$ to $VVy_{n-1}$ calculated by the interruption process of the timer before the 1 ms predetermined time interval (before the latest anti-shake operation is performed), by the second high-pass filter time constant hy, and then subtracting the resulting quotient from the second digital angular velocity signal $Vy_n(VVy_n=Vy_n-(\Sigma VVy_{n-1})\div hy)$.

In the embodiment, the angular velocity detection operation in (portion of) the interruption process of the timer includes a process in the angular velocity detection unit 25 and a process of inputting process of the first and second angular velocities vx and vy from the angular velocity detection unit 25 to the CPU 21.

In the integration processing operation regarding the first direction x, the first digital displacement angle $Bx_n$ is calculated by the summation from the first digital angular velocity $VVx_1$ at the point when the interruption process of the timer commences, t=1, (see step S12 in FIG. 4) to the first digital angular velocity $VVx_n$ at the point when the latest anti-shake operation is performed (t=n), ($Bx_n=\Sigma VVx_n$, see (3) in FIG. 6).

Similarly, in the integration processing operation regarding the second direction y, the second digital displacement angle $By_n$ is calculated by the summation from the second digital angular velocity $VVy_1$ at the point when the interruption process of the timer commences to the second digital angular velocity $VVy_n$ at the point when the latest anti-shake operation is performed ($By_n=\Sigma VVy_n$).

The CPU 21 calculates the position $S_n$ where the imaging unit 39a (the movable unit 30a) should be moved, corresponding to the hand-shake quantity (the first and second digital displacement angles $Bx_n$ and $By_n$) calculated for the first direction x and the second direction y, based on a position conversion coefficient zz (a first position conversion coefficient zx for the first direction x and a second position conversion coefficient zy for the second direction y).

The coordinate of position $S_n$ in the first direction x is defined as $Sx_n$, and the coordinate of position $S_n$ in the second direction y is defined as $Sy_n$. The movement of the movable unit 30a, which includes the imaging unit 39a, is performed by using electro-magnetic force and is described later.

The driving force $D_n$ drives the driver circuit 29 in order to move the movable unit 30a to the position $S_n$. The coordinate of the driving force $D_n$ in the first direction x is defined as the first driving force $Dx_n$ (after D/A conversion: a first PWM duty dx). The coordinate of the driving force $D_n$ in the second direction y is defined as the second driving force $Dy_n$ (after D/A conversion: a second PWM duty dy).

In a positioning operation regarding the first direction x, the coordinate of position $S_n$ in the first direction x is defined as $Sx_n$, and is the product of the latest first digital displacement angle $Bx_n$ and the first position conversion coefficient zx ($Sx_n=zx\times Bx_n$, see (3) in FIG. 6).

In a positioning operation regarding the second direction y, the coordinate of position $S_n$ in the second direction y is defined as $Sy_n$, and is the product of the latest second digital displacement angle $By_n$ and the second position conversion coefficient zy ($Sy_n=zy\times By_n$).

The anti-shake unit 30 is an apparatus that corrects for the hand-shake effect by moving the imaging unit 39a to the position $S_n$, by canceling the lag of the photographing subject image on the imaging surface of the imaging device of the imaging unit 39a, and by stabilizing the photographing subject image displayed on the imaging surface of the imaging device, during the exposure time and when the anti-shake operation is performed (IS=1).

The anti-shake unit 30 has a fixed unit 30b, and a movable unit 30a which includes the imaging unit 39a and can be moved about on the xy plane.

During the exposure time when the anti-shake operation is not performed (IS=0), the movable unit 30a is fixed to (held at) a predetermined position. In the embodiment, the predetermined position is at the center of the range of movement.

The anti-shake unit 30 does not have a fixed-positioning mechanism that maintains the movable unit 30a in a fixed position when the movable unit 30a is not being driven (drive OFF state).

The driving of the movable unit 30a of the anti-shake unit 30, including movement to a predetermined fixed (held) position, is performed by the electro-magnetic force of the coil unit for driving and the magnetic unit for driving, through the driver circuit 29 which has the first PWM duty dx input from the PWM 0 of the CPU 21 and has the second PWM duty dy input from the PWM 1 of the CPU 21 (see (5) in FIG. 6).

The detected-position $P_n$ of the movable unit 30a, either before or after the movement effected by the driver circuit 29, is detected by the hall element unit 44a and the hall-element signal-processing unit 45.

Information regarding the first coordinate of the detected-position $P_n$ in the first direction x, in other words a first detected-position signal px, is input to the A/D converter A/D 2 of the CPU 21 (see (2) in FIG. 6). The first detected-position signal px is an analog signal that is converted to a digital signal by the A/D converter A/D 2 (A/D conversion operation). The first coordinate of the detected-position $P_n$ in the first direction x, after the A/D conversion operation, is defined as $pdx_n$ and corresponds to the first detected-position signal px.

Information regarding the second coordinate of the detected-position $P_n$ in the second direction y, in other words a second detected-position signal py, is input to the A/D converter A/D 3 of the CPU 21. The second detected-position signal py is an analog signal that is converted to a digital signal by the A/D converter A/D 3 (A/D conversion operation). The second coordinate of the detected-position $P_n$ in the second direction y, after the A/D conversion operation, is defined as $pdy_n$ and corresponds to the second detected-position signal py.

The PID (Proportional Integral Differential) control calculates the first and second driving forces $Dx_n$ and $Dy_n$ on the basis of the coordinate data for the detected-position $P_n$ ($pdx_n$, $pdy_n$) and the position $S_n$ ($Sx_n$, $Sy_n$) following movement.

The calculation of the first driving force $Dx_n$ is based on the first subtraction value $ex_n$, the first proportional coefficient Kx, the sampling cycle θ, the first integral coefficient Tix, and the first differential coefficient Tdx ($Dx_n = Kx \times \{ex_n \theta \div Tix \times \Sigma ex_n + Tdx \div \theta \times (ex_n - ex_{n-1})\}$, see (4) in FIG. 6). The first subtraction value $ex_n$ is calculated by subtracting the first coordinate of the detected-position $P_n$ in the first direction x after the A/D conversion operation, $pdx_n$, from the coordinate of position $S_n$ in the first direction x, $Sx_n$ ($ex_n = Sx_n - pdx_n$).

The calculation of the second driving force $Dy_n$ is based on the second subtraction value $ey_n$, the second proportional coefficient Ky, the sampling cycle θ, the second integral coefficient Tiy, and the second differential coefficient Tdy ($D_n = Ky \times \{ey_n + \theta \div Tiy \times \Sigma ey_n + Tdy \div \theta \times (ey_n - ey_{n-1})\}$). The second subtraction value $ey_n$ is calculated by subtracting the second coordinate of the detected-position $P_n$ in the second direction y after the A/D conversion operation, $pdy_n$, from the coordinate of position $S_n$ in the second direction y, $Sy_n$ ($ey_n = Sy_n - pdy_n$).

The value of the sampling cycle θ is set to a predetermined time interval of 1 ms.

Driving the movable unit 30a to the position $S_n$, ($Sx_n$, $Sy_n$) corresponding to the anti-shake operation of the PID control, is performed when the photographing apparatus 1 is in the anti-shake mode (IS=1) where the anti-shake switch 14a is set to the ON state.

When the anti-shake parameter IS is 0, the PID control that does not correspond to the anti-shake operation is performed so that the movable unit 30a is moved to the center of the range of movement (the predetermined position).

The movable unit 30a has a coil unit for driving that is comprised of a first driving coil 31a and a second driving coil 32a, an imaging unit 39a that has the imaging device, and a hall element unit 44a as a magnetic-field change-detecting element unit. In the embodiment, the imaging device is a CCD; however, the imaging device may be another imaging device such as a CMOS etc.

The fixed unit 30b has a magnetic unit for driving that is comprised of a first position-detecting and driving magnet 411b, a second position-detecting and driving magnet 412b, a first position-detecting and driving yoke 431b, and a second position-detecting and driving yoke 432b.

The fixed unit 30b movably supports the movable unit 30a in the first direction x and in the second direction y.

When the center area of the imaging device is intersected by the optical axis LX of the camera lens 67, the relationship between the position of the movable unit 30a and the position of the fixed unit 30b is arranged so that the movable unit 30a is positioned at the center of its range of movement in both the first direction x and the second direction y, in order to utilize the full size of the imaging range of the imaging device.

A rectangle shape, which is the form of the imaging surface of the imaging device, has two diagonal lines. In the embodiment, the center of the imaging device is at the intersection of these two diagonal lines.

The first driving coil 31a, the second driving coil 32a, and the hall element unit 44a are attached to the movable unit 30a.

The first driving coil 31a forms a seat and a spiral shaped coil pattern. The coil pattern of the first driving coil 31a has lines which are parallel to the second direction y, thus creating the first electro-magnetic force to move the movable unit 30a that includes the first driving coil 31a, in the first direction x.

The first electro-magnetic force occurs on the basis of the current direction of the first driving coil 31a and the magnetic-field direction of the first position-detecting and driving magnet 411b.

The second driving coil 32a forms a seat and a spiral shaped coil pattern. The coil pattern of the second driving coil 32a has lines which are parallel to the first direction x, thus creating the second electro-magnetic force to move the movable unit 30a that includes the second driving coil 32a, in the second direction y.

The second electro-magnetic force occurs on the basis of the current direction of the second driving coil 32a and the magnetic-field direction of the second position-detecting and driving magnet 412b.

The first and second driving coils 31a and 32a are connected to the driver circuit 29, which drives the first and second driving coils 31a and 32a, through the flexible circuit board (not depicted). The first PWM duty dx is input to the driver circuit 29 from the PWM 0 of the CPU 21, and the second PWM duty dy is input to the driver circuit 29 from the PWM 1 of the CPU 21. The driver circuit 29 supplies power to the first driving coil 31a that corresponds to the value of the first PWM duty dx, and to the second driving coil 32a that corresponds to the value of the second PWM duty dy, to drive the movable unit 30a.

The first position-detecting and driving magnet 411b is attached to the movable unit side of the fixed unit 30b, where the first position-detecting and driving magnet 411b faces the first driving coil 31a and the horizontal hall element hh10 in the third direction z.

The second position-detecting and driving magnet 412b is attached to the movable unit side of the fixed unit 30b, where the second position-detecting and driving magnet 412b faces the second driving coil 32a and the vertical hall element hv10 in the third direction z.

The first position-detecting and driving magnet 411b is attached to the first position-detecting and driving yoke 431b, under the condition where the N pole and S pole are arranged in the first direction x. The first position-detecting and driving yoke 431b is attached to the fixed unit 30b, on the side of the movable unit 30a, in the third direction z.

The second position-detecting and driving magnet 412b is attached to the second position-detecting and driving yoke 432b, under the condition where the N pole and S pole are arranged in the second direction y. The second position-detecting and driving yoke 432b is attached to the fixed unit 30b, on the side of the movable unit 30a, in the third direction z.

The first and second position-detecting and driving yokes 431b, 432b are made of a soft magnetic material.

The first position-detecting and driving yoke 431b prevents the magnetic-field of the first position-detecting and driving magnet 411b from dissipating to the surroundings, and raises the magnetic-flux density between the first position-detecting and driving magnet 411b and the first driving coil 31a, and between the first position-detecting and driving magnet 411b and the horizontal hall element hh10.

The second position-detecting and driving yoke 432b prevents the magnetic-field of the second position-detecting and driving magnet 412b from dissipating to the surroundings, and raises the magnetic-flux density between the second position-detecting and driving magnet 412b and the second driving coil 32a, and between the second position-detecting and driving magnet 412b and the vertical hall element hv10.

The hall element unit 44a is a single-axis unit that contains two magnetoelectric converting elements (magnetic-field change-detecting elements) utilizing the Hall Effect to detect the first detected-position signal px and the second detected-position signal py specifying the first coordinate in the first direction x and the second coordinate in the second direction y, respectively, of the present position $P_n$ of the movable unit 30a.

One of the two hall elements is a horizontal hall element hh10 for detecting the first coordinate of the position $P_n$ of the movable unit 30a in the first direction x, and the other is a vertical hall element hv10 for detecting the second coordinate of the position $P_n$ of the movable unit 30a in the second direction y.

The horizontal hall element hh10 is attached to the movable unit 30a, where the horizontal hall element hh10 faces the first position-detecting and driving magnet 411b of the fixed unit 30b in the third direction z.

The vertical hall element hv10 is attached to the movable unit 30a, where the vertical hall element hv10 faces the second position-detecting and driving magnet 412b of the fixed unit 30b in the third direction z.

When the center of the imaging device intersects the optical axis LX, it is desirable to have the horizontal hall element hh10 positioned on the hall element unit 44a facing an intermediate area between the N pole and S pole of the first position-detecting and driving magnet 411b in the first direction x, as viewed from the third direction z. In this position, the horizontal hall element hh10 utilizes the maximum range in which an accurate position-detecting operation can be performed based on the linear output-change (linearity) of the single-axis hall element.

Similarly, when the center of the imaging device intersects the optical axis LX, it is desirable to have the vertical hall element hv10 positioned on the hall element unit 44a facing an intermediate area between the N pole and S pole of the second position-detecting and driving magnet 412b in the second direction y, as viewed from the third direction z.

The hall-element signal-processing unit 45 has a first hall-element signal-processing circuit 450 and a second hall-element signal-processing circuit 460.

The first hall-element signal-processing circuit 450 detects a horizontal potential-difference x10 between the output terminals of the horizontal hall element hh10 that is based on an output signal of the horizontal hall element hh10.

The first hall-element signal-processing circuit 450 outputs the first detected-position signal px, which specifies the first coordinate of the position $P_n$ of the movable unit 30a in the first direction x, to the A/D converter A/D 2 of the CPU 21, on the basis of the horizontal potential-difference x10.

The second hall-element signal-processing circuit 460 detects a vertical potential-difference y10 between the output terminals of the vertical hall element hv10 that is based on an output signal of the vertical hall element hv10.

The second hall-element signal-processing circuit 460 outputs the second detected-position signal py, which specifies the second coordinate of the position $P_n$ of the movable unit 30a in the second direction y, to the A/D converter A/D 3 of the CPU 21, on the basis of the vertical potential-difference y10.

Figure 4:
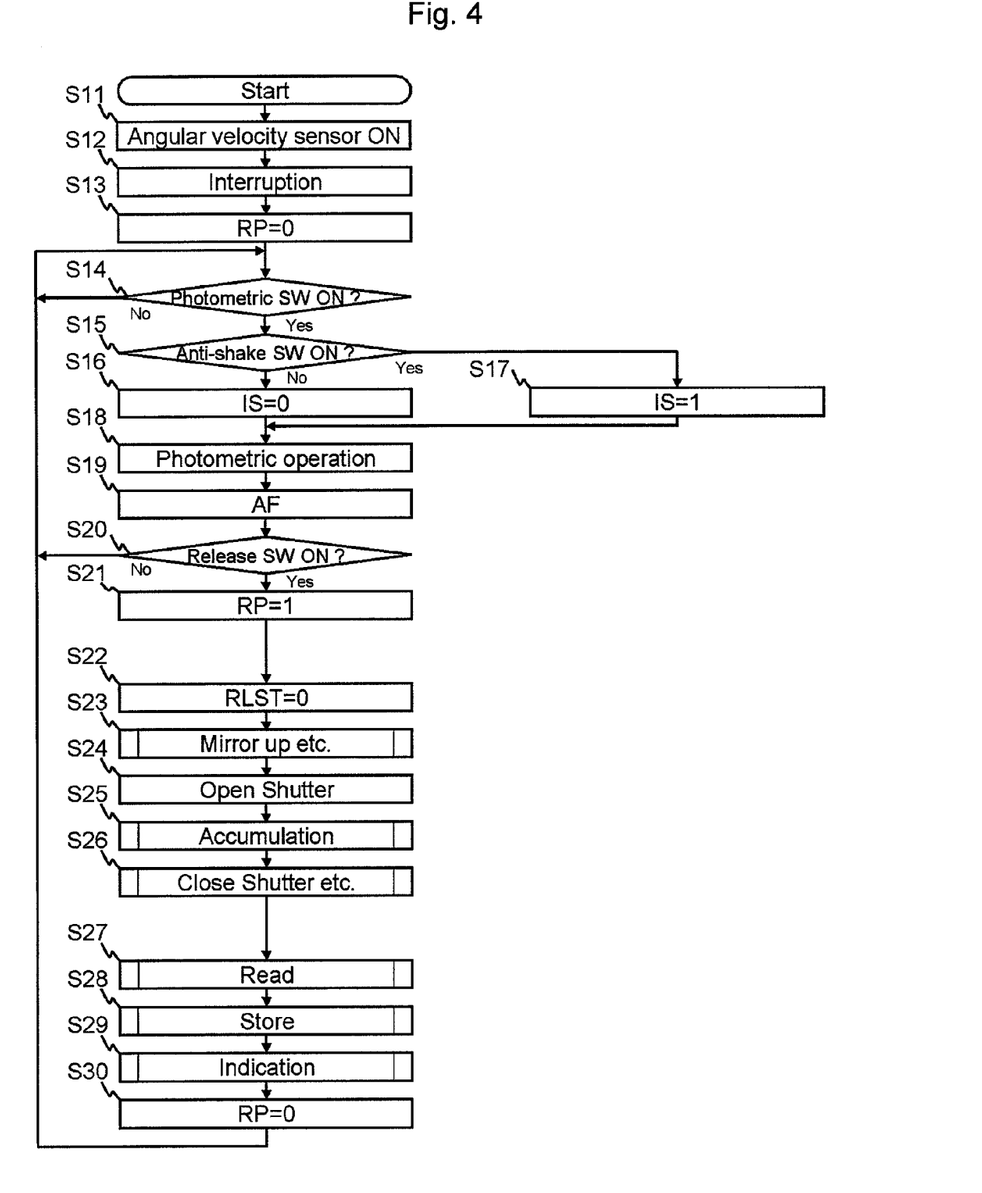
FIG. 4 is a flowchart that shows the main operation of the photographing apparatus.

Next, the main operation of the photographing apparatus 1 in the embodiment is explained by using the flowchart in FIG. 4.

When the photographing apparatus 1 is set to the ON state, the electrical power is supplied to the angular velocity detection unit 25 so that the angular velocity detection unit 25 is set to the ON state in step S11.

In step S12, the interruption process of the timer at the predetermined time interval (1 ms) commences. In step S13, the value of the release state parameter RP is set to 0. The detail of the interruption process of the timer in the embodiment is explained later by using the flowchart in FIG. 5.

In step S14, it is determined whether the photometric switch 12a is set to the ON state. When it is determined that the photometric switch 12a is not set to the ON state, the operation returns to step S14 and the process in step S14 is repeated. Otherwise, the operation continues on to step S15.

In step S15, it is determined whether the anti-shake switch 14a is set to the ON state. When it is determined that the anti-shake switch 14a is not set to the ON state, the value of the anti-shake parameter IS is set to 0 in step S16. Otherwise, the value of the anti-shake parameter IS is set to 1 in step S17.

In step S18, the AE sensor of the AE unit 23 is driven, the photometric operation is performed, and the aperture value and exposure time are calculated.

In step S19, the AF sensor and the lens control circuit of the AF unit 24 are driven to perform the AF sensing and focus operations, respectively.

In step S20, it is determined whether the release switch 13a is set to the ON state. When the release switch 13a is not set to the ON state, the operation returns to step S14 and the process in steps S14 to S19 is repeated. Otherwise, the operation continues to step S21 and then the release sequence operation commences.

In step S21, the value of the release state parameter RP is set to 1.

In step S22, the value of the release time counter RLST is set to 0.

In step S23, the mirror-up operation of the mirror 18a and the aperture closing operation corresponding to the aperture value that is either preset or calculated, are performed by the mirror-aperture-shutter unit 18.

After the mirror-up operation is finished, the opening operation of the shutter 18b (the movement of the front curtain of the shutter 18b) commences in step S24.

In step S25, the exposure operation, i.e., the electric charge accumulation of the imaging device (CCD etc.), is performed. After the exposure time has elapsed, the closing operation of the shutter 18b (the movement of the rear curtain in the shutter 18b), the mirror-down operation of the mirror 18a, and the opening operation of the aperture are performed by the mirror-aperture-shutter unit 18, in step S26.

In step S27, the electric charge which has accumulated in the imaging device during the exposure time is read. In step S28, the CPU 21 communicates with the DSP 19 so that the image processing operation is performed based on the electric charge read from the imaging device. The image, on which the image processing operation is performed, is stored to the memory in the photographing apparatus 1. In step S29, the image that is stored in the memory is displayed on the indicating unit 17. In step S30, the value of the release state parameter RP is set to 0 so that the release sequence operation is finished, and the operation then returns to step S14, in other words the photographing apparatus 1 is set to a state where the next imaging operation can be performed.

Figure 5:
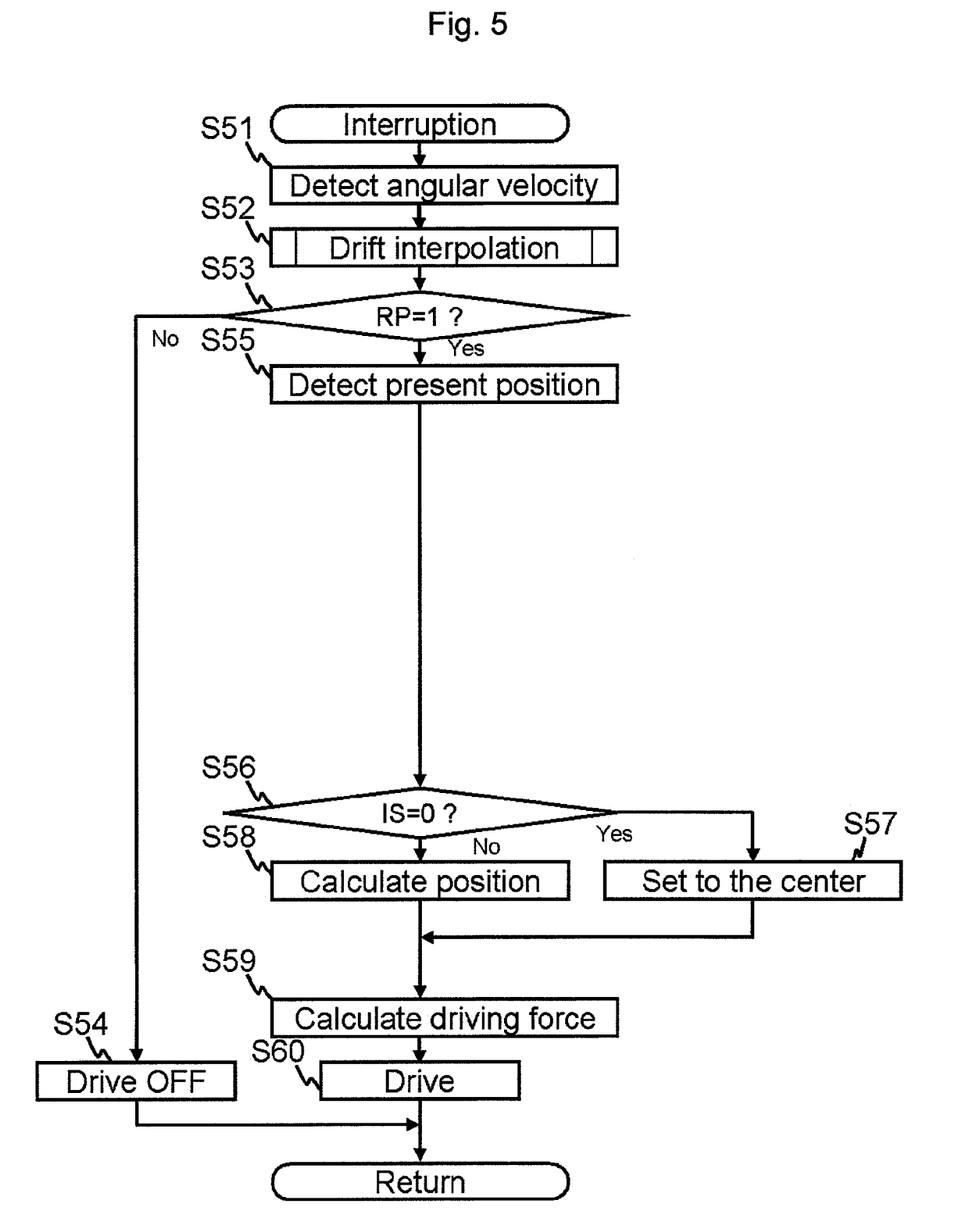
FIG. 5 is a flowchart that shows the detail of the interruption process of the timer.

Next, the interruption process of the timer in the embodiment, which commences in step S12 in FIG. 4 and is performed at every predetermined time interval (1 ms) independent of the other operations, is explained by using the flowchart in FIG. 5.

When the interruption process of the timer commences, the first angular velocity vx, which is output from the angular velocity detection unit 25, is input to the A/D converter A/D 0 of the CPU 21 and converted to the first before-drift-interpolation digital angular velocity signal $BVx_n$, in step S51. The second angular velocity vy, which is also output from the angular velocity detection unit 25, is input to the A/D converter A/D 1 of the CPU 21 and converted to the second before-drift-interpolation digital angular velocity signal $BVy_n$ (the angular velocity detection operation).

In step S52, the drift interpolation processing operation is performed; the drift components in the first and second before-drift-interpolation digital angular velocity signals $BVx_n$ and $BVy_n$ are reduced corresponding to the offset output during the release sequence operation, and the first and second digital angular velocity signals $Vx_n$ and $Vy_n$ are calculated. However, except for during the predetermined period (the drift-interpolation reference time GTC) after the release sequence operation commences, the drift interpolation processing operation is not performed, so the values of the first and second digital angular velocity signals $Vx_n$ and $Vy_n$ are respectively set to the same as the values of the first and second before-drift-interpolation digital angular velocity signals $BVx_n$ and $BVy_n$. The detail of the drift interpolation processing operation in the embodiment is explained later by using the flowchart in FIG. 7.

The low frequencies of the first and second digital angular velocity signals $Vx_n$ and $Vy_n$ are reduced in the digital high-pass filter processing operation (the first and second digital angular velocities $VVx_n$ and $VVy_n$).

In step S53, it is determined whether the value of the release state parameter RP is set to 1. When it is determined that the value of the release state parameter RP is not set to 1, driving the movable unit 30a is set to OFF state, or the anti-shake unit 30 is set to a state where the driving control of the movable unit 30a is not performed in step S54. Otherwise, the operation proceeds directly to step S55.

In step S55, the hall element unit 44a detects the position of the movable unit 30a, and the first and second detected-position signals px and py are calculated by the hall-element signal-processing unit 45. The first detected-position signal px is then input to the A/D converter A/D 2 of the CPU 21 and converted to a digital signal $pdx_n$, whereas the second detected-position signal py is input to the A/D converter A/D 3 of the CPU 21 and also converted to a digital signal $pdy_n$, both of which thus determine the present position $P_n$ ($pdx_n$, $pdy_n$) of the movable unit 30a.

In step S56, it is determined whether the value of the anti-shake parameter IS is 0. When it is determined that the value of the anti-shake parameter IS is 0 (IS=0), in other words when the photographing apparatus is not in anti-shake mode, the position $S_n$ ($Sx_n$, $Sy_n$) where the movable unit 30a (the imaging unit 39a) should be moved is set at the center of the range of movement of the movable unit 30a, in step S57. When it is determined that the value of the anti-shake parameter IS is not 0 (IS=1), in other words when the photographing apparatus is in anti-shake mode, the position $S_n$ ($Sx_n$, $Sy_n$) where the movable unit 30a (the imaging unit 39a) should be moved is calculated on the basis of the first and second angular velocities vx and vy, in step S58.

In step S59, the first driving force $Dx_n$ (the first PWM duty dx) and the second driving force $Dy_n$ (the second PWM duty dy) of the driving force $D_n$, which moves the movable unit 30a to the position $S_n$, are calculated on the basis of the position $S_n$ ($Sx_n$, $Sy_n$) that was determined in step S57, or step S58, and the present position $P_n$ ($pdx_n$, $pdy_n$).

In step S60, the first driving coil unit 31a is driven by applying the first PWM duty dx to the driver circuit 29, and the second driving coil unit 32a is driven by applying the second PWM duty dy to the driver circuit 29, so that the movable unit 30a is moved to position $S_n$ ($Sx_n$, $Sy_n$).

The process of steps S59 and S60 is an automatic control calculation that is used with the PID automatic control for performing general (normal) proportional, integral, and differential calculations.

Next, the detail of the drift interpolation processing operation in step S52 in FIG. 5 is explained by using the flowchart in FIG. 7. When the drift interpolation processing operation commences, it is determined whether the value of the release time counter RLST is less than or equal to the value of the drift-interpolation reference time GTC, in step S71.

When it is determined that the value of the release time counter RLST is less than or equal to the value of the drift-interpolation reference time GTC, the operation continues to step S72. Otherwise, the operation (the drift interpolation processing operation) is finished.

In step S72, the first digital angular velocity signal $Vx_n$ is calculated on the basis of the first before-drift-interpolation digital angular velocity signal $BVx_n$, the drift-interpolation reference time GTC, the maximum offset output value OF, and the release time counter RLST ($Vx_n = BVx_n - (OF - OF \times RLST \div GTC)$).

Similarly, the second digital angular velocity signal $Vy_n$ is calculated on the basis of the second before-drift-interpolation digital angular velocity signal $BVy_n$, the drift-interpolation reference time GTC, the maximum offset output value OF, and the release time counter RLST ($Vy_n = BVy_n - (OF - OF \times RLST \div GTC)$).

In step S73, the value of the release time counter RLST is increased by a value of 1, then the operation (the drift interpolation processing operation) is finished.

In the embodiment, the drift interpolation processing operation for the digital angular velocity signal is performed during the predetermined period (the drift-interpolation reference time GTC), and after the release sequence operation commences.

When the release sequence operation commences, the large change of the electric power of the main power supply of the photographing apparatus 1 occurs, which affects the high impedance part of the gyro signal processing circuit, such as the first high-pass filter circuit 27a etc., so that the offset (the lag from the reference value) occurs in the output from the angular velocity detection unit 25 (the offset output occurs).

In the calculation for the hand-shake quantity and the position to where the movable unit 30a should be moved for anti-shake operation, the output signal from the angular velocity detection unit 25 is integrated; therefore, the change of the value of the output signal caused by the offset output causes a drift in the movement of the movable unit 30a in the anti-shake operation. This is an unnecessary movement for the anti-shake operation, so the anti-shake operation cannot be performed correctly due to this drift.

However, because of the drift interpolation processing operation in the embodiment, the offset output corresponding to the change of the electric power of the main power supply of the photographing apparatus 1 is reduced approximately linearly, so the anti-shake operation (the detection of the hand-shake quantity) can be performed correctly.

Further, in the embodiment, the voltage used to detect the change of electric power of the main power supply of the photographing apparatus 1, is not detected by using detection apparatus except for the angular velocity sensor. Therefore, it is unnecessary to include another detection apparatus that is different from the angular velocity sensor, so the anti-shake operation (the detection of the hand-shake quantity) can be performed correctly, even if the offset from the angular velocity detection unit 25 occurs, without complicating the construction of the anti-shake apparatus.

Further, it is explained that the CPU 21 modifies (reduces) the offset output in the output signal from the angular velocity sensor during the predetermined period of first time (the drift-interpolation reference time GTC), and after the release switch 13a is set to the ON state (the release sequence operation commences). However, this modification (reduction) of the offset output in the output signal from the angular velocity sensor may be performed during another period of the anti-shake operation, which may be performed except for during the release sequence operation, when a large change of the electric power of the main power supply of the photographing apparatus 1 occurs, such as a charge period of the electric flash (strobe light, not depicted) of the photographing apparatus 1.

Further, it is explained that the movable unit 30a has the imaging device; however, the movable unit 30a may have a hand-shake correcting lens instead of the imaging device.

Further, it is explained that the hall element is used for position detection as the magnetic-field change-detecting element. However, another detection element, an MI (Magnetic Impedance) sensor such as a high-frequency carrier-type magnetic-field sensor, a magnetic resonance-type magnetic-field detecting element, or an MR (Magneto-Resistance effect) element may be used for position detection purposes. When one of either the MI sensor, the magnetic resonance-type magnetic-field detecting element, or the MR element is used, the information regarding the position of the movable unit can be obtained by detecting the magnetic-field change, similar to using the hall element.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2006-192647 (filed on Jul. 13, 2006), which is expressly incorporated herein by reference, in its entirety.

The invention claimed is:

1. An anti-shake apparatus for image stabilizing, comprising: an angular velocity sensor that detects an angular velocity; and a controller that controls said angular velocity sensor and performs an anti-shake operation on the basis of an output signal from said angular velocity sensor, said controller beginning performing a modification of an offset output in the value of said output signal at a beginning of a predetermined period of said anti-shake operation, wherein said predetermined period begins when a release switch of a photographing apparatus including said anti-shake apparatus is set to an ON state and ends after a first time elapses.

2. The anti-shake apparatus according to claim 1, wherein a length of said first time is double a time constant of a circuit that performs a high-pass filter processing operation on said output signal from said angular velocity sensor.

3. The anti-shake apparatus according to claim 1, wherein said modification is performed as said offset output decreases linearly from a commencement of said predetermined period to a finish of said predetermined period.

4. The anti-shake apparatus according to claim 1, wherein said controller does not perform said modification except for during said predetermined period.

5. A photographing apparatus, comprising: an angular velocity sensor that detects an angular velocity; and a controller that controls said angular velocity sensor and performs an anti-shake operation for image stabilizing on the basis of an output signal from said angular velocity sensor, said controller beginning performing a modification of an offset output in the value of said output signal at a beginning of a predetermined period of said anti-shake operation of a photographing operation, wherein said predetermined period begins when a release switch of a photographing apparatus including said anti-shake apparatus is set to an ON state and ends after a first time elapses.

6. The anti-shake apparatus according to claim 1, wherein the controller performs the modification of the offset output by subtracting the offset output from the output signal of the angular velocity sensor.

7. The anti-shake apparatus according to claim 1, wherein the controller further performs A/D conversion of the output signal from the angular velocity sensor before performing the modification of the offset output.

8. The anti-shake apparatus according to claim 1, further comprising a high-pass filter circuit, wherein the high-pass filter circuit reduces a low frequency signal component from an analog signal of the output signal from the angular velocity sensor before performing the modification of the offset output, and the controller further reduces a low frequency signal component from a digital signal of the output signal from the angular velocity sensor after performing the modification of the offset output.

9. The anti-shake apparatus according to claim 1, further comprising a driver that moves an imaging unit to correct a hand-shake effect,
wherein the controller performs the anti-shake operation by producing a driving signal of the driver based on the output signal from the angular velocity sensor, from which the offset output has been reduced.

10. The photographing apparatus according to claim 5, wherein a length of said first time is double a time constant of a circuit that performs a high-pass filter processing operation on said output signal from said angular velocity sensor.

11. The photographing apparatus according to claim 5, wherein said modification is performed as said offset output decreases linearly from a commencement of said predetermined period to a finish of said predetermined period.

12. The photographing apparatus according to claim 5, wherein said controller does not perform said modification except for during said predetermined period.

13. The photographing apparatus according to claim 5, wherein the controller performs the modification of the offset output by subtracting the offset output from the output signal of the angular velocity sensor.

14. The photographing apparatus according to claim 5, wherein the controller further performs A/D conversion of the output signal from the angular velocity sensor before performing the modification of the offset output.

15. The photographing apparatus according to claim 5, further comprising a high-pass filter circuit, wherein the high-pass filter circuit reduces a low frequency signal component from an analog signal of the output signal from the angular velocity sensor before performing the modification of the offset output, and the controller further reduces a low frequency signal component from a digital signal of the output signal from the angular velocity sensor after performing the modification of the offset output.

16. The photographing apparatus according to claim 5, further comprising a driver that moves an imaging unit to correct a hand-shake effect,
wherein the controller performs the anti-shake operation by producing a driving signal of the driver based on the output signal from the angular velocity sensor, from which the offset output has been reduced.

* * * * *